No. 857,036. PATENTED JUNE 18, 1907.
J. W. DALRYMPLE.
SOIL PULVERIZER, LISTER, AND MARKER.
APPLICATION FILED OCT. 17, 1906.

WITNESSES:

James W. Dalrymple, INVENTOR.

By

ATTORNEYS

UNITED STATES PATENT OFFICE.

JAMES W. DALRYMPLE, OF SOLSBERRY, INDIANA.

SOIL PULVERIZER, LISTER, AND MARKER.

No. 857,036.   Specification of Letters Patent.   Patented June 18, 1907.

Application filed October 17, 1906. Serial No. 339,400.

*To all whom it may concern:*

Be it known that I, JAMES W. DALRYMPLE, a citizen of the United States, residing at Solsberry, in the county of Greene and State of Indiana, have invented a new and useful Soil Pulverizer, Lister, and Marker, of which the following is a specification.

This invention has relation to soil pulverizers, listers and markers and it consists in the novel construction and arrangement of its parts as hereinafter shown and described.

The implement comprises a frame including a plurality of transversely disposed members having downwardly and rearwardly inclined undersurfaces, in combination with rows of earth engaging blades located thereon. The said blades are of peculiar configuration and are so shaped as to pulverize the earth, list the same and mark the surface thereof. The marking blades are pointed at their lower ends and are provided at their front with curved cutting edges, the listing and pulverizing blades are provided with substantially semi-ovate cutting edges which terminate in straight edges provided at one end of the blade. The last said blades may be reversed upon the supporting members so as to have the greatest transverse thickness under the front or rear portion of the supporting member as desired. The last said blade may be located upon the supporting members in positions parallel with the line of draft or inclined at angles thereto.

Figure 1:
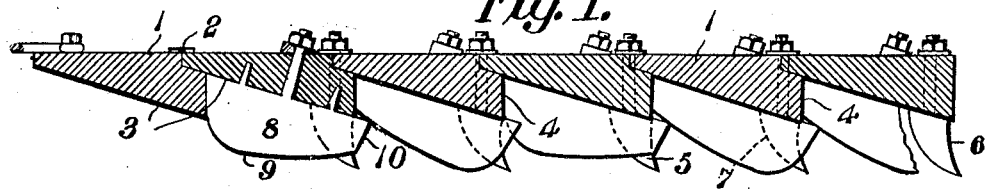
Figure 2:
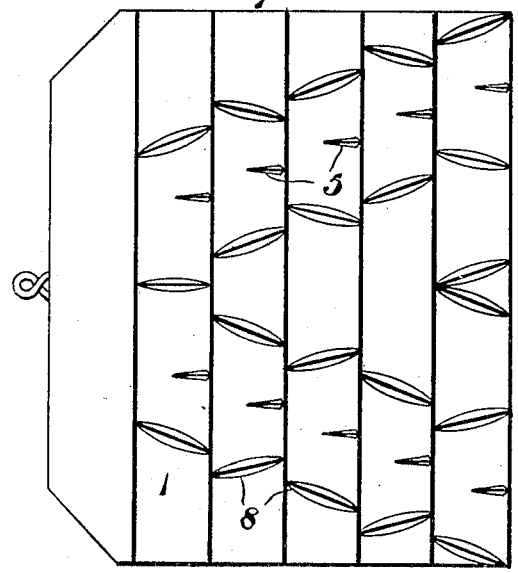

In the accompanying drawing, Figure 1 is a longitudinal sectional view of the implement. Fig. 2 is a bottom plan view of the implement illustrating another arrangement of the blades, and Fig. 3 is a bottom plan view of the implement illustrating still another arrangement of the blades.

The implement comprises a frame made up of a plurality of transversely disposed members 1, 1 which are framed or hinged together at their edges as at 2. The said members are provided with the downwardly and rearwardly inclined under surfaces 3 and the precipitous rear walls 4. The earth cutting and marking blades 5 are pointed at their lower ends and are provided with the forward curved edges 7 and the rear edges 6. The edges 7 are sharp.

The earth pulverizing and listing blades 8 are provided with the substantially semi-ovate sharpened edges 9 which terminate in the inclined edges 10 located at the ends of the said blades. As illustrated in Fig. 1 the blades 8 may be so positioned upon the supporting member 9 as to have the straight edge 10 in contact with the precipitous side 4 of the next adjacent forward supporting member or they may be positioned so as to have the end of the semi-ovate edge adjacent to the wall 4 of the next forward member 1. When the straight edges 10 of the blades 8 are adjacent the precipitous walls 4 of the members in front the implement is especially adapted for splitting clods and pulverizing the earth as the greatest breadth of the blade is positioned at the rear portion of the supporting member 1 and consequently the semi-ovate edge of the blade is so positioned with relation to the surface of the ground as to impart to the soil a shearing cut. When the positions of the blades are reversed upon the members 1 the blades are usually pitched at an angle to the line of draft in order to list or throw the earth to one side or the other. As above stated, the blades 5 are for marking the soil and they are usually positioned upon the supporting members in parallel relation to the line of draft and enter the ground at sufficient depth to prevent any tendency of lateral displacement of the implement which might be caused by the resistance of the soil against the sides of the blades which are pitched at angles to the line of draft.

Figure 3:
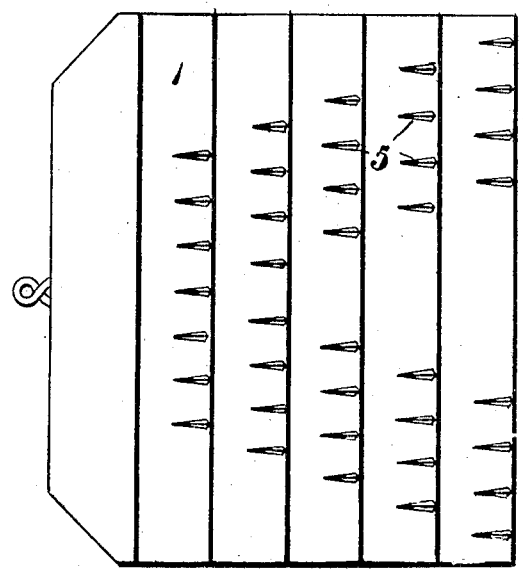

Fig. 2 illustrates the combination and arrangement of the blades when the implement is used as a pulverizer, lister and marker, and Fig. 3 illustrates the arrangement of the blades when the implement is used as a harrow and leveler.

The figures in the drawing illustrate but a few of the many combinations that can be made with the cutters and blades.

Having described my invention what I claim as new and desire to secure by Letters-Patent is:—

In an implement of the class described, a frame including a plurality of transversely disposed members having downwardly and rearwardly inclined surfaces, pointed blades attached to said members and being disposed in planes parallel with the line of draft, blades adapted to be adjustably positioned upon the supporting members and having substantially semi-ovate cutting edges and straight edges located at the ends of said cutting edges.

In testimony that I claim the foregoing as my own, I have hereto affixed my signature in the presence of two witnesses.

JAMES W. DALRYMPLE.

Witnesses:
CORENA M. BARNES,
JAMES JENKIN.